(12) United States Patent
Zhang et al.

(10) Patent No.: US 12,359,690 B2
(45) Date of Patent: Jul. 15, 2025

(54) SYSTEM FOR LUBRICATING A CRANKSHAFT

(71) Applicant: CUMMINS INC., Columbus, IN (US)

(72) Inventors: Qing Zhang, Wuhan (CN); Leaf Li, Wuhan (CN); Xin Jia, Wuhan (CN)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 18/368,808

(22) Filed: Sep. 15, 2023

(65) Prior Publication Data

US 2025/0092909 A1 Mar. 20, 2025

(51) Int. Cl.
  F16C 3/14 (2006.01)
  F01M 1/06 (2006.01)

(52) U.S. Cl.
  CPC .............. F16C 3/14 (2013.01); F01M 1/06 (2013.01); *F01M 2001/062* (2013.01); *F16C 2360/22* (2013.01)

(58) Field of Classification Search
  None
  See application file for complete search history.

(56) References Cited

U.S. PATENT DOCUMENTS

| | | | |
|---|---|---|---|
| 3,768,335 A | 10/1973 | Mayer | |
| 4,023,547 A * | 5/1977 | Reisacher | F02F 1/002 123/196 R |
| 5,138,991 A | 8/1992 | Wojdyla | |
| 5,152,373 A * | 10/1992 | Callies | F01M 1/06 123/196 R |
| 6,202,620 B1 | 3/2001 | Yamaguchi | |
| 6,857,411 B2 | 2/2005 | Ronneburger et al. | |
| 7,954,600 B2 * | 6/2011 | Ohta | F16C 3/14 123/196 R |
| 9,279,444 B2 | 3/2016 | Beaurepaire et al. | |

(Continued)

FOREIGN PATENT DOCUMENTS

| | | |
|---|---|---|
| CN | 103443482 | 12/2013 |
| CN | 203743182 | 7/2014 |

(Continued)

OTHER PUBLICATIONS

Office Action for CN Application No. 201910585237.3, dated Dec. 21, 2021.

(Continued)

*Primary Examiner* — Vicky A Johnson
(74) *Attorney, Agent, or Firm* — Foley & Lardner LLP

(57) ABSTRACT

A system for lubricating a crankshaft of an engine includes a first main journal including a first shaft and in fluid communication with an oil supply. The system also includes a first main journal oil passage in fluid communication with the oil supply extending through the first shaft. The system also includes a first pin journal including a first crank, and a first oil passage extending partially through the first crank in fluid communication with the first main journal oil passage. The system also includes a second pin journal including a second crank, and a second oil passage extending partially through the second crank in fluid communication with the first main journal oil passage. Each of the first oil passage extends at a first non-zero angle and the second oil passage extends at a second non-zero angle relative to the first main journal oil passage.

20 Claims, 8 Drawing Sheets

(56) References Cited

U.S. PATENT DOCUMENTS

| | | |
|---|---|---|
| 10,072,699 B2 | 9/2018 | Uesu et al. |
| 2015/0322889 A1 | 11/2015 | Ni et al. |
| 2017/0268392 A1 | 9/2017 | Song et al. |

FOREIGN PATENT DOCUMENTS

| | | |
|---|---|---|
| CN | 106065898 | 11/2016 |
| CN | 112177704 A | 1/2021 |
| JP | H-11-280440 A | 10/1999 |
| JP | 2000-104725 A | 4/2000 |
| JP | 2005-127227 A | 5/2005 |
| WO | WO-97/13983 A1 | 10/1996 |
| WO | WO-2018/206589 A2 | 11/2018 |
| WO | WO-2021/248603 A1 | 12/2021 |

OTHER PUBLICATIONS

Office Action for CN Application No. 201910585237.3, dated May 18, 2022.

\* cited by examiner

SYSTEM FOR LUBRICATING A CRANKSHAFT

TECHNICAL FIELD

The present application relates generally to a lubricating system for a crankshaft, and preferably a crankshaft of an engine system.

BACKGROUND

An engine system includes a lubricating system to provide lubricant to various components such as the crankshaft. The crankshaft includes main journal bearings in fluid communication with an oil supply.

SUMMARY

According to one embodiment, a system for lubricating a crankshaft of an engine, includes a first main journal including a first main journal housing and a first shaft. The first main journal is in fluid communication with an oil supply. The system also includes a first main journal oil passage extending at least partially through the first shaft. The first main journal oil passage is in fluid communication with the oil supply. The system also includes a first pin journal including a first pin journal housing and a first crank. The system further includes a first oil passage extending at least partially through the first crank. The first oil passage is in fluid communication with the first main journal oil passage. The system also includes a second pin journal comprising a second pin journal housing and a second crank. The system also includes a second oil passage extending at least partially through the second crank. The second oil passage is in fluid communication with the first main journal oil passage.

According to another embodiment, a system for lubricating a crankshaft of an engine includes a first main journal, a second main journal, a third main journal, a fourth main journal, and fifth main journal configured to rotate about a longitudinal axis and are in fluid communication with an oil supply. The system also includes a first pin journal positioned between the first main journal and the fifth main journal. The first pin journal is fluidly isolated from the fifth main journal. The system also includes a second pin journal positioned between the first main journal and the second main journal. The second pin is fluidly isolated from the second main journal. The system also includes a third pin journal positioned between the second main journal and the third main journal. The third pin journal is fluidly isolated from the third pin journal. The system further includes a fourth pin positioned between the third main journal and the fourth main journal. The fourth pin journal is fluidly isolated from the fourth main journal.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

DETAILED DESCRIPTION

Figure 1:
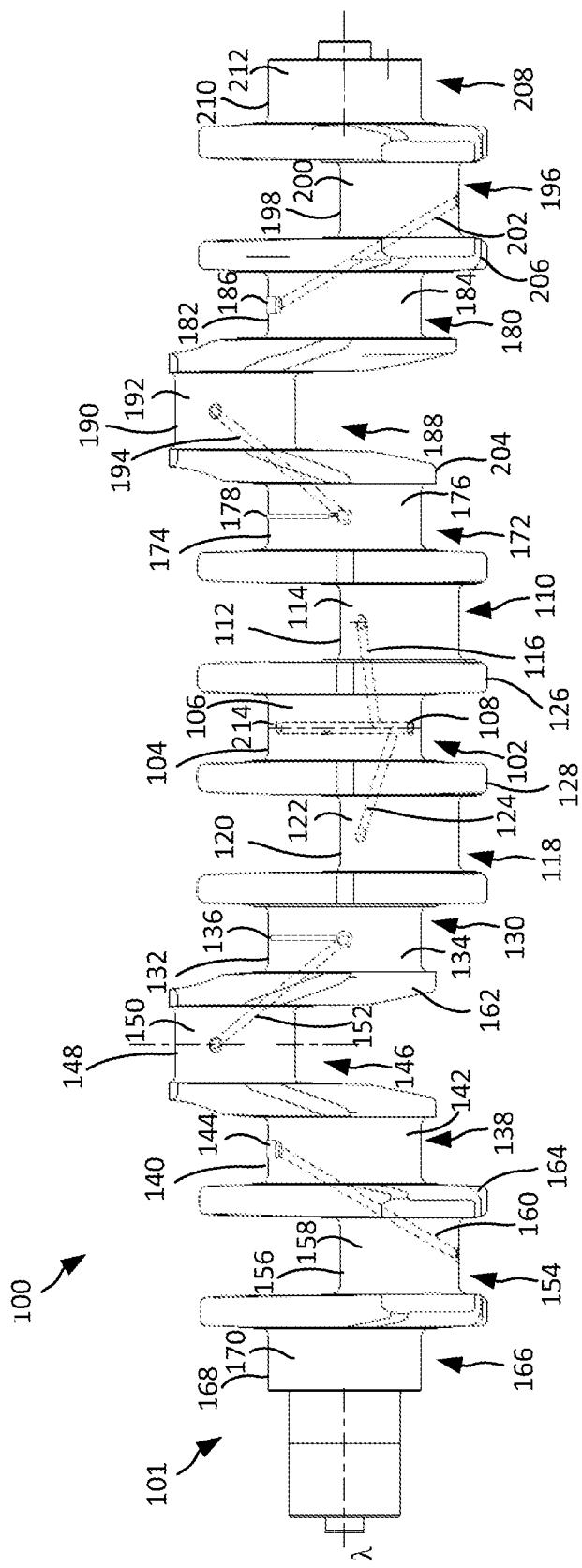
FIG. 1 is a cross-sectional view of a lubricating system for an engine according to one embodiment.

Following below are more detailed descriptions of various concepts related to, and implementations of, methods, and apparatuses, for a lubrication system. The various concepts introduced above and discussed in greater detail below may be implemented in any of a number of ways, as the described concepts are not limited to any particular manner of implementation. Examples of specific implementations and applications are provided primarily for illustrative purposes.

I. Overview

An internal combustion (IC) engine is a heat engine where the combustion of a fuel occurs with an oxidizer (usually air) in one or more combustion chambers. Pistons located within the combustion chambers are coupled to a crankshaft that rotates as the pistons move up and down in response to the combustion cycles. Pistons can be arranged in a variety of ways in an IC engine, including in a straight line (e.g., inline) and in a v-configuration.

Inline crankshafts, such as crankshaft 101, include main journals, such as a first main journal 102, a second main journal 130, a third main journal 138, a fourth main journal 166, a fifth main journal 172, a sixth main journal 180, and a seventh main journal 208, located along a longitudinal axis, where the main journals remain stationary relative to the longitudinal axis. Inline crankshafts also include pin journals, such as a first pin journal 110, a second pin journal 118, a third pin journal 146, a fourth pin journal 154, a fifth pin journal 188, and a sixth pin journal 196, coupled to the pistons, where the pin journals move relative to the longitudinal axis as the pistons move. To lubricate the main journals, such as main journals 102, 130, 138, 166, 172, and 130, and pin journals, such as pin journals 110, 118, 146, 154, 188 and 196, a main oil supply provides oil to each of the main journals through an oil hole, such as a first pin journal oil hole 302, a second pin journal oil hole 304, a third pin journal oil hole 402, a fourth pin journal oil hole 502, a fifth pin journal oil hole 602, and a sixth pin journal oil hole 702, drilled into each main journal. Oil is provided to the pin journals by an oil passage, such as a first oil passage 116, a second oil passage 124, a third oil passage 152, a fourth oil passage 160, a fifth oil passage 194, and a sixth oil passage 202, that extends from the oil hole in the main journal to the corresponding pin journal.

Implementations herein relate to a system to lubricate crankshaft components that requires oil holes to be drilled to each of the main journals, such as the first main journal 102, the second main journal 130, the third main journal 138, the fourth main journal 166, the fifth main journal 172, the sixth main journal 180, and the seventh main journal 208, and each of the pin journals, such as the first pin journal 110, the second pin journal 118, the third pin journal 146, the fourth pin journal 154, the fifth pin journal 188, and the sixth pin journal 196. Each main journal 102, 130, 138, 166, 172, 180, and 208 in the crankshaft 101 is supplied oil by the main oil supply. In some implementations, the pin journals 110, 118, 146, 154, 188, and 196 are provided with oil by incorporating at least one oil passage in each main journal.

II. Overview of a Lubricating System

As shown in FIG. 1, an engine system includes a lubricating system 100. The engine system also includes an engine in communication with the lubricating system 100. The system 100 includes a plurality of passages to provide lubrication (e.g., oil, etc.) to various are of the engine system. FIG. 1 is a cross section view of the system 100 for lubricating a crankshaft for an engine system. The crankshaft and components thereof are manufactured from materials typically used in crankshafts including, but not limited to, various alloys of iron, aluminum, steel, nickel, titanium, and other metals and metal alloys suitable for use in a crankshaft. The crankshaft rotates and is coupled to a plurality of pistons within the engine system.

A system 100 for lubricating a crankshaft 101 of an engine includes a first main journal 102 that includes a first main journal housing 104 and a first shaft 106. The first main journal 102 is in fluid communication with an oil supply. The system 100 also includes a first main journal oil passage 108 extending at least partially through the first shaft 106. The first main journal oil passage 108 is in fluid communication with the oil supply. The system 100 also includes a first pin journal 110 including a first pin journal housing 112 and a first crank 114. The system 100 further includes a first oil passage 116 extending at least partially through the first crank 114. The first oil passage 116 is in fluid communication with the first main journal oil passage 108. The system 100 also includes a second pin journal 118 comprising a second pin journal housing 120 and a second crank 122. The system 100 also includes a second oil passage 124 extending at least partially through the second crank 122. The second oil passage 124 in fluid communication with the first main journal oil passage 108.

The system 100 for lubricating a crankshaft 101 of an engine includes the first main journal 102. The first main journal 102 may be generally circular in cross-section and be disposed along a longitudinal axis λ such that the longitudinal axis passes through the center of the first main journal 102. In some embodiments, the first main journal 102 rotates about a first main bearing.

The first main journal 102 includes the first main journal housing 104. The first main journal housing 104 contacts a first main journal bearing during rotation. Thus, the first main journal 102 is in fluid communication with a lubrication supply (e.g., an oil supply, etc.) to provide a lubricant (e.g., oil, etc.) to the space between the first main journal housing 104 and the first main journal bearing.

The first main journal 102 also includes the first shaft 106. The first shaft 106 is positioned within the first main journal housing 104. In some embodiments, there is a space (e.g., a lubrication space, etc.) between the first main journal housing 104 and the first shaft 106. For example, lubricant is supplied through the first shaft 106 to the lubrication space.

The system 100 also includes the first main journal oil passage 108. The first main journal oil passage 108 is positioned within the first main journal housing 104. According to this embodiment, the first main journal passage extends substantially perpendicular to the longitudinal axis λ along a vertical plane (e.g., the y-plane) within the first shaft 106. The first main journal oil passage 108 is in fluid communication with the oil supply. For example, the first main journal oil passage 108 receives oil from the oil supply and provides the oil to the lubricating system 100.

The lubricating system 100 further includes the first pin journal 110. The first pin journal 110 is positioned adjacent to the first main journal 102. For example, the first pin journal 110 is positioned adjacent to a first side of the first main journal 102. The first pin journal 110 may be generally circular in cross-section and be rotatably coupled to a piston (not shown) such that the first pin journal 110 moves relative to the main journal while the pistons move up and down.

The first pin journal 110 includes the first pin journal housing 112 and a first crank 114. The first pin journal 110 is positioned a distance away from the longitudinal axis 2. The first crank 114 is positioned within the first pin journal housing 112. In some embodiments, there is a first crank lubrication space between the first crank 114 and the first pin journal housing 112. The first crank 114 is configured to rotate within the first pin journal housing 112.

The lubricating system 100 further includes the first oil passage 116. The first oil passage 116 extends at least partially through the first crank 114 and is in fluid communication with the first main journal oil passage 108. For example, the first oil passage 116 receives a portion of lubricant (e.g., oil, etc.) from the first main journal oil passage 108. The first oil passage 116 also extends from the first main journal oil passage 108 at a first non-zero angle. For example, the first oil passage 116 extends at the first non-zero angle in a range between 60 degrees to 90 degrees (inclusive) relative to the first main journal oil passage 108.

The lubricating system 100 also includes the second pin journal 118. The second pin journal 118 is also positioned adjacent to the first main journal 102. For example, the second pin journal 118 is positioned adjacent to a second side of the first main journal 102. The second pin journal 118 may be generally circular in cross-section and be rotatably coupled to a piston (not shown) such that the second pin journal 118 moves relative to the first main journal 102 while the pistons move up and down.

The second pin journal 118 includes the second pin journal housing 120 and the second crank 122. The second pin journal 118 is positioned a distance away from the longitudinal axis 2. The second crank 122 is positioned within the second pin journal housing 120. In some embodiments, there is a second crank lubrication space between the second crank 122 and the second pin journal housing 120. The second crank 122 is configured to rotate within the second pin journal housing 120.

The system 100 further includes a second oil passage 124. The second oil passage 124 extends at least partially through the second crank 122. The second oil passage 124 is in fluid communication with the first main journal oil passage 108. For example, the second oil passage 124 receives a portion of lubricant (e.g., oil, etc.) from the first main journal oil passage 108. The second oil passage 124 also extends from the first main journal oil passage 108 at a second non-zero angle. For example, the second oil passage 124 extends at the second non-zero angle in a range between 60 degrees to 90 degrees (inclusive) relative to the first main journal oil passage 108. According to this embodiment, the first non-zero angle and the second non-zero angles are different, however in other embodiments it is possible that the first non-zero angle and the second non-zero angle are substantially equal.

As shown in FIG. 1, each of the first oil passage 116 and the second oil passage 124 are in fluid communication with the first main journal oil passage 108. However, the second oil passage 124 is positioned vertically offset from the first oil passage 116. For example, an opening of the second oil passage 124 in fluid communication with the first main journal oil passage 108 is positioned below an opening of the first oil passage 116 in fluid communication with the first main journal oil passage 108. For example, the opening of the second oil passage 124 in fluid communication with the first main journal oil passage 108 is positioned between the opening of the first oil passage 116 in fluid communication with the first main journal oil passage 108 and a bottom edge of the first shaft 106.

The system 100 further includes a first crank web 126. The first crank web 126 is positioned between the first main journal 102 and the first pin journal 110. The first crank web 126 is rotatably coupled to each of the first main journal 102 and the first pin journal. The first crank web 126 provides rotational and translational movement between the first pin journal 110 and the first main journal 102.

A portion of the first oil passage 116 extends through the first crank web 126. For example, a first opening of the first oil passage 116 is in fluid communication with the first main journal oil passage 108 and extends through the first shaft 106, the first crank web 126, and the first crank 114. A second end of the first oil passage 116 in positioned at an edge of the first crank 114 to provide oil to a first pin lubrication space defined between the first pin journal housing 112 and the first crank 114.

The system 100 also includes a second crank web 128. The second crank web 128 is positioned between the first main journal 102 second pin journal 118. The second crank web 128 is rotatably coupled to each of the first main journal 102 and the second pin journal 118. The second crank web 128 provides rotational and translational movement between the second pin journal 118 and the first main journal 102.

A portion of the second oil passage 124 extends through the second crank web 128. For example, a first opening of the second oil passage 124 is in fluid communication with the first main journal oil passage 108 and extends through the first shaft 106, the second crank web 128, and the second crank 122. A second end of the second oil passage 124 in positioned at an edge of the second crank 122 to provide oil to a second pin lubrication space defined between the second pin journal housing 120 and the second crank 122.

The system 100 also includes a second main journal 130. The second main journal 130 coupled to the second pin journal 118 opposite the first main journal 102. The second main journal 130 may also be generally circular in cross-section and be disposed along the longitudinal axis 2 such that the longitudinal axis λ passes through the center of the second main journal 130. In some embodiments, the second main journal 130 rotates about a second main bearing.

The second main journal 130 includes a second main journal housing 132. In some embodiments, the second main journal housing 132 contacts the second main journal bearing during rotation. The second main journal 130 is in fluid communication with a lubrication supply (e.g., an oil supply, etc.) provides oil to the space between the second main journal housing 132 and the second main journal bearing and at least one pin journal.

The second main journal 130 also includes a second shaft 134. The second shaft 134 is positioned within the second main journal housing 132. In some embodiments, there is a space (e.g., a lubrication space, etc.) between the second main journal housing 132 and the second shaft 134. For example, lubricant is supplied through the second shaft 134 to the lubrication space.

The system 100 further includes a second main journal oil passage 136. The second main journal oil passage 136 is positioned within the second shaft 134. The second main journal oil passage 136 is defined substantially vertical within the second main journal 130. The second main journal oil passage 136 is also in fluid communication with the oil supply. The second main journal oil passage 136 receives a portion of oil from the oil supply and provides oil to a portion of the system.

The system 100 further includes a third main journal 138. The third main journal 138 may also be generally circular in cross-section and be disposed along the longitudinal axis λ such that the longitudinal axis λ passes through the center of the third main journal 138. In some embodiments, the third main journal 138 rotates about a third main bearing.

The third main journal 138 includes a third main journal housing 140. In some embodiments, the third main journal housing 140 contacts the third main journal bearing during rotation. The third main journal 138 is in fluid communication with the lubrication supply (e.g., an oil supply, etc.) provides oil to the space between the third main journal housing 140 and the third main journal bearing and at least one pin journal.

The third main journal 138 also includes a third shaft 142. The third shaft 142 is positioned within the third main journal housing 140. In some embodiments, there is a space (e.g., a lubrication space, etc.) between the third main journal housing 140 and the third shaft 142. For example, lubricant is supplied through the third shaft 142 to the lubrication space.

The system 100 further includes a third main journal oil passage 144. The third main journal oil passage 144 is positioned within the third shaft 142. The third main journal oil passage 144 is defined substantially vertical within the third main journal 138. The third main journal oil passage 144 is also in fluid communication with the oil supply. The third main journal oil passage 144 receives a portion of oil from the oil supply and provides oil to a portion of the system.

The system 100 also includes a third pin journal 146. The third pin journal 146 is positioned between the second main journal 130 and the third main journal 138. The third pin journal 146 may be generally circular in cross-section and be rotatably coupled to a piston (not shown) such that the third pin journal 146 moves relative to each of the second main journal 130 and the third main journal 138 while the pistons move up and down.

The third pin journal 146 includes a third pin journal housing 148 and a third crank 150. The third pin journal 146 is positioned a distance away from the longitudinal axis 2. The third crank 150 is positioned within the third pin journal housing 148. In some embodiments, there is a third crank lubrication space between the third crank 150 and the third pin journal housing 148. The third crank 150 is configured to rotate within the third pin journal housing 148.

The system 100 further includes a third oil passage 152. The third oil passage 152 extends at least partially through the third crank 150. The third oil passage 152 is in fluid communication with the second main journal oil passage 136. For example, the third oil passage 152 receives a portion of lubricant (e.g., oil, etc.) from the second main journal oil passage 136. The third oil passage 152 also extends from the second main journal oil passage 136 at a third non-zero angle. For example, the third oil passage 152 extends at the third non-zero angle in a range between 30 degrees to 80 degrees (inclusive) relative to the second main journal oil passage 136. According to this embodiment, the third non-zero angle is different (e.g., to equal to, etc.) from each of the first non-zero angle and the second non-zero angles, however in other embodiments it is possible that the third non-zero angle is substantially equal to one of the first non-zero angle or the second non-zero angle.

The system 100 further includes a fourth pin journal 154. The fourth pin journal 154 is positioned adjacent to the third main journal 138 opposite the third pin journal 146. The fourth pin journal 154 may be generally circular in cross-section and be rotatably coupled to a piston (not shown) such that the fourth pin journal 154 moves relative to the third main journal 138 while the pistons move up and down.

The fourth pin journal 154 includes a fourth pin journal housing 156 and a fourth crank 158. The fourth pin journal 154 is positioned a distance away from the longitudinal axis 2. The fourth crank 158 is positioned within the fourth pin journal housing 156. In some embodiments, there is a fourth crank lubrication space between the fourth crank 158 and the fourth pin journal housing 156. The fourth crank 158 is configured to rotate within the fourth pin journal housing 156.

The system 100 also includes a fourth oil passage 160. The fourth oil passage 160 extends at least partially through the fourth crank 158. The fourth oil passage 160 is in fluid communication with the third main journal oil passage 144. For example, the fourth oil passage 160 receives a portion of lubricant (e.g., oil, etc.) from the third main journal oil passage 144. The fourth oil passage 160 also extends from the third main journal oil passage 144 at a fourth non-zero angle. For example, the fourth oil passage 160 extends at the fourth non-zero angle in a range between 90 degrees to 150 degrees (inclusive) relative to the third main journal oil passage 144. According to this embodiment, the fourth non-zero angle is different (e.g., not equal to, etc.) from each of the first non-zero angle, the second non-zero angles, and third non-zero angle. However, in other embodiments it is possible that the fourth non-zero angle is substantially equal to one of the first non-zero angle, the second non-zero angle, or the third non-zero angle.

The system 100 also includes a third crank web 162. The third crank web 162 is positioned between the second main journal 130 and the third pin journal 146. The third crank web 162 is rotatably coupled to each of the second main journal 130 and the third pin journal 146. The third crank web 162 provides rotational and translational movement between the second main journal 130 and the third pin journal 146.

A portion of the third oil passage 152 extends through the third crank web 162. For example, a first opening of the third oil passage 152 is in fluid communication with the second main journal oil passage 136 and extends through the second shaft 134, the third crank web 162, and the third crank 150. A second end of the third oil passage 152 in positioned at an edge of the third crank 150 to provide oil to a third pin lubrication space defined between the third pin journal housing 148 and the third crank 150.

The system 100 also includes a fourth crank web 164. The fourth crank web 164 is positioned between the third main journal 138 and the fourth pin journal 154. The fourth crank web 164 is rotatably coupled to each of the third main journal 138 and the fourth pin journal 154. The fourth crank web 164 provides rotational and translational movement between the third main journal 138 and the fourth pin journal 154.

A portion of the fourth oil passage 160 extends through the fourth crank web 164. For example, a first opening of the fourth oil passage 160 is in fluid communication with the third main journal oil passage 144 and extends through the third shaft 142, the fourth crank web 164, and the fourth crank 158. A second end of the fourth oil passage 160 in positioned at an edge of the fourth crank 158 to provide oil to a fourth pin lubrication space defined between the fourth pin journal housing 156 and the fourth crank 158.

The system 100 also includes a fourth main journal 166. The fourth main journal 166 may also be generally circular in cross-section and be disposed along the longitudinal axis λ such that the longitudinal axis λ passes through the center of the fourth main journal 166. In some embodiments, the fourth main journal 166 rotates about a fourth main bearing.

The fourth main journal 166 includes a fourth main journal housing 168. In some embodiments, the fourth main journal housing 168 contacts the fourth main journal bearing during rotation. The fourth main journal 166 is in fluid communication with the oil supply and provides oil to the space between the fourth main journal housing 168 and the fourth main journal bearing. According to this embodiment, the fourth main journal 166 does not provide oil to any other of the plurality of main journals (e.g., 102, 130, 138, etc.) nor any of the plurality of pin journals (e.g., 118, 146, 154, etc.).

The fourth main journal 166 also includes a fourth shaft 170. The fourth shaft 170 is positioned within the fourth main journal housing 168. In some embodiments, there is a lubrication space between the fourth main journal housing 168 and the fourth shaft 170. For example, lubricant is supplied through the fourth shaft 170 to the lubrication space.

The system 100 also includes a fifth main journal 172. The fifth main journal 172 may also be generally circular in cross-section and is disposed along the longitudinal axis λ such that the longitudinal axis λ passes through the center of the fifth main journal 172. In some embodiments, the fifth main journal 172 rotates about a fifth main bearing. The fifth main journal 172 is positioned adjacent to the first pin journal 110.

The fifth main journal 172 includes a fifth main journal housing 174. In some embodiments, the fifth main journal housing 174 contacts the fifth main journal bearing during rotation. The fifth main journal 172 is in fluid communication with the oil supply and provides oil to the space between the fifth main journal housing 174 and the fifth main journal bearing.

The fifth main journal 172 also includes a fifth shaft 176. The fifth shaft 176 is positioned within the fifth main journal housing 174. In some embodiments, there is a lubrication space between the fifth main journal housing 174 and the fifth shaft 176. For example, lubricant is supplied through the fourth shaft 170 to the lubrication space.

The system 100 includes a fifth main journal oil passage 178. The fifth main journal oil passage 178 is positioned within the fifth shaft 176. The fifth main journal oil passage 178 is defined substantially vertically within the fifth main journal 172. The fifth main journal oil passage 178 is also in fluid communication with the oil supply. For example, the fifth main journal oil passage 178 receives a portion of oil from the oil supply and provides oil to a portion of the system.

The system 100 also includes a sixth main journal 180. The sixth main journal 180 may also be generally circular in cross-section and be disposed along the longitudinal axis λ such that the longitudinal axis λ passes through the center of the sixth main journal 180. In some embodiments, the sixth main journal 180 rotates about a sixth main bearing.

The sixth main journal 180 includes a sixth main journal housing 182. In some embodiments, the sixth main journal housing 182 contacts the sixth main journal bearing during rotation. The sixth main journal 180 is in fluid communication with the oil supply and provides oil to the space between the sixth main journal housing 182 and the sixth main journal bearing.

The sixth main journal 180 also includes a sixth shaft 184. The sixth shaft 184 is positioned within the sixth main journal housing 182. In some embodiments, there is a lubrication space between the sixth main journal housing 182 and the sixth shaft 184. For example, lubricant is supplied through the sixth shaft 184 to the lubrication space.

Further, the system 100 includes a sixth main journal oil passage 186. The sixth main journal oil passage 186 is positioned within the sixth shaft 184. The sixth main journal oil passage 186 is defined substantially vertically within the sixth main journal 180. The sixth main journal oil passage 186 is also in fluid communication with the oil supply. For example, the sixth main journal oil passage 186 receives a portion of oil from the oil supply and provides oil to a portion of the system.

The system 100 further includes a fifth pin journal 188. The fifth pin journal 188 is positioned between the fifth main journal 172 and the sixth main journal 180. The fifth pin journal 188 may be generally circular in cross-section and be rotatably coupled to a piston (not shown) such that the fifth pin journal 188 moves relative to the fifth main journal 172 and the sixth main journal 180 while the pistons move up and down.

The fifth pin journal 188 includes a fifth pin journal housing 190 and a fifth crank 192. The fifth pin journal 188 is positioned a distance away from the longitudinal axis 2. The fifth crank 192 is positioned within the fifth pin journal housing 190. In some embodiments, there is a fifth crank lubrication space between the fifth crank 192 and the fifth pin journal housing 190. The fifth crank 192 is configured to rotate within the fifth pin journal housing 190.

The system 100 also includes a fifth oil passage 194. The fifth oil passage 194 extends at least partially through the fifth crank 192. The fifth oil passage 194 is in fluid communication with the fifth main journal oil passage 178. For example, the fifth oil passage 194 receives a portion of lubricant (e.g., oil, etc.) from the fifth main journal oil passage 178. The fifth oil passage 194 also extends from the fifth main journal oil passage 178 at a fifth non-zero angle. For example, the fifth oil passage 194 extends at the fifth non-zero angle in a range between 30 degrees to 80 degrees (inclusive) relative to the fifth main journal oil passage 178. According to this embodiment, the fifth non-zero angle is substantially equal to the third non-zero angle and substantially different (e.g., not equal to, etc.) from each of the first non-zero angle, the second non-zero angles, and the fourth non-zero angle. However, in other embodiments it is possible that the fifth non-zero angle is substantially equal to one of the first non-zero angle, the second non-zero angle, or the fourth non-zero angle.

The system 100 also includes a sixth pin journal 196. The sixth pin journal 196 is positioned adjacent to the sixth main journal 180. Similarly, to the previously described pin journals, the sixth pin journal 196 may also be generally circular in cross-section and is rotatably coupled to a piston (not shown) such that the sixth pin journal 196 moves relative to the sixth main journal 180 while the pistons move up and down.

The sixth pin journal 196 also includes a sixth pin journal housing 198 and a sixth crank 200. The sixth pin journal housing 198 is positioned a distance away from the longitudinal axis A. The sixth crank 200 is positioned within the sixth pin journal housing 198. In some embodiments, there is a sixth crank lubrication space between the sixth crank 200 and the sixth pin journal housing 198. The sixth crank 200 is configured to rotate within the sixth pin journal housing 198.

The system 100 also includes a sixth oil passage 202. The sixth oil passage 202 extends at least partially through the sixth crank 200. The sixth oil passage 202 is in fluid communication with the sixth main journal oil passage 186. For example, the sixth oil passage 202 receives a portion of lubricant (e.g., oil, etc.) from the sixth main journal oil passage 186. The sixth oil passage 202 also extends from the sixth main journal oil passage 186 at a sixth non-zero angle. For example, the sixth oil passage 202 extends at the sixth non-zero angle in a range between 90 degrees to 150 degrees (inclusive) relative to the sixth main journal oil passage 186. According to this embodiment, the sixth non-zero angle is substantially equal to the fourth non-zero angle and substantially different (e.g., not equal to, etc.) from each of the first non-zero angle, the second non-zero angles, the third non-zero angle, and the fifth non-zero angle. However, in other embodiments it is possible that the sixth non-zero angle is substantially equal to one of the first non-zero angle, the second non-zero angle, the third non-zero angle or the fifth non-zero angle.

The system 100 also includes a fifth crank web 204. The fifth crank web 204 is positioned between the fifth main journal 172 and the fifth pin journal 188. The fifth crank web 204 is rotatably coupled to each of the fifth main journal 172 and the fifth pin journal 188. The fifth crank web 204 provides rotational and translational movement between the fifth pin journal 188 and the fifth main journal 172.

A portion of the fifth oil passage 194 extends through the fifth crank web 204. For example, a first opening of the fifth oil passage 194 is in fluid communication with the fifth main journal oil passage 178 and extends through the fifth shaft 176, the fifth crank web 204, and the fifth crank 192. A second end of the fifth oil passage 194 in positioned at an edge of the fifth crank 192 to provide oil to a fifth pin lubrication space defined between the fifth pin journal housing 190 and the fifth crank 192.

The system 100 further includes a sixth crank web 206. The sixth crank web 206 is positioned between the sixth main journal 180 and the sixth pin journal 196. The sixth crank web 206 is rotatably coupled to each of the sixth main journal 180 and the sixth pin journal 196. The sixth crank web 206 provides rotational and translational movement between the sixth pin journal 196 and the sixth main journal 180.

A portion of the sixth oil passage 202 extends through the sixth crank web 206. For example, a first opening of the sixth oil passage 202 is in fluid communication with the sixth main journal oil passage 186 and extends through the sixth shaft 184, the sixth crank web 206, and the sixth crank 200. A second end of the sixth oil passage 202 is positioned at an edge of the sixth crank 200 to provide oil to a sixth pin lubrication space defined between the sixth pin journal housing 198 and the sixth crank 200.

The system 100 also includes a seventh main journal 208. The seventh main journal 208 is similar to the fourth main journal 166. The seventh main journal 208 may also be generally circular in cross-section and is disposed along the longitudinal axis λ such that the longitudinal axis 2 passes through the center of the seventh main journal 208. In some embodiments, the seventh main journal 208 rotates about a seventh main bearing.

The seventh main journal 208 includes a seventh main journal housing 210. In some embodiments, the seventh main journal housing 210 contacts the seventh main journal bearing during rotation. The seventh main journal 208 is in fluid communication with the oil supply and provides oil to the space between the seventh main journal housing 210 and the seventh main journal bearing. Similarly, to the fourth main journal 166, the seventh main journal 208 does not provide oil to any other of the plurality of main journals (e.g., 172, 180, etc.) nor any of the plurality of pin journals (e.g., 110, 188, 196, etc.).

The seventh main journal 208 also includes a seventh shaft 212. The seventh shaft 212 is positioned within the seventh main journal housing 210. In some embodiments, there is a lubrication space between the seventh main journal housing 210 and the seventh shaft 212. For example, lubricant is supplied through the seventh shaft 212 to the lubrication space.

Figure 2:
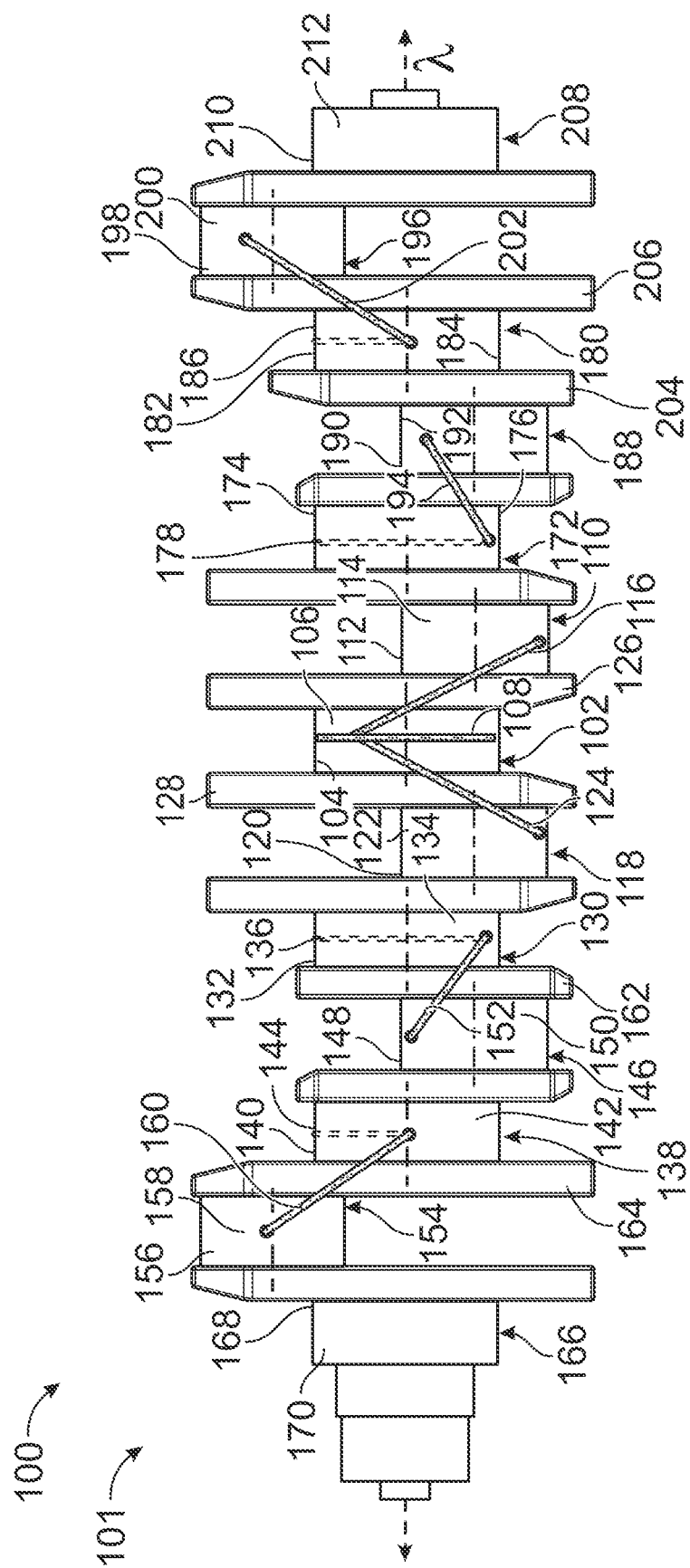
FIG. 2 is another cross-sectional view of the lubricating system from an engine according to the embodiment of FIG. 1.
Figure 3:
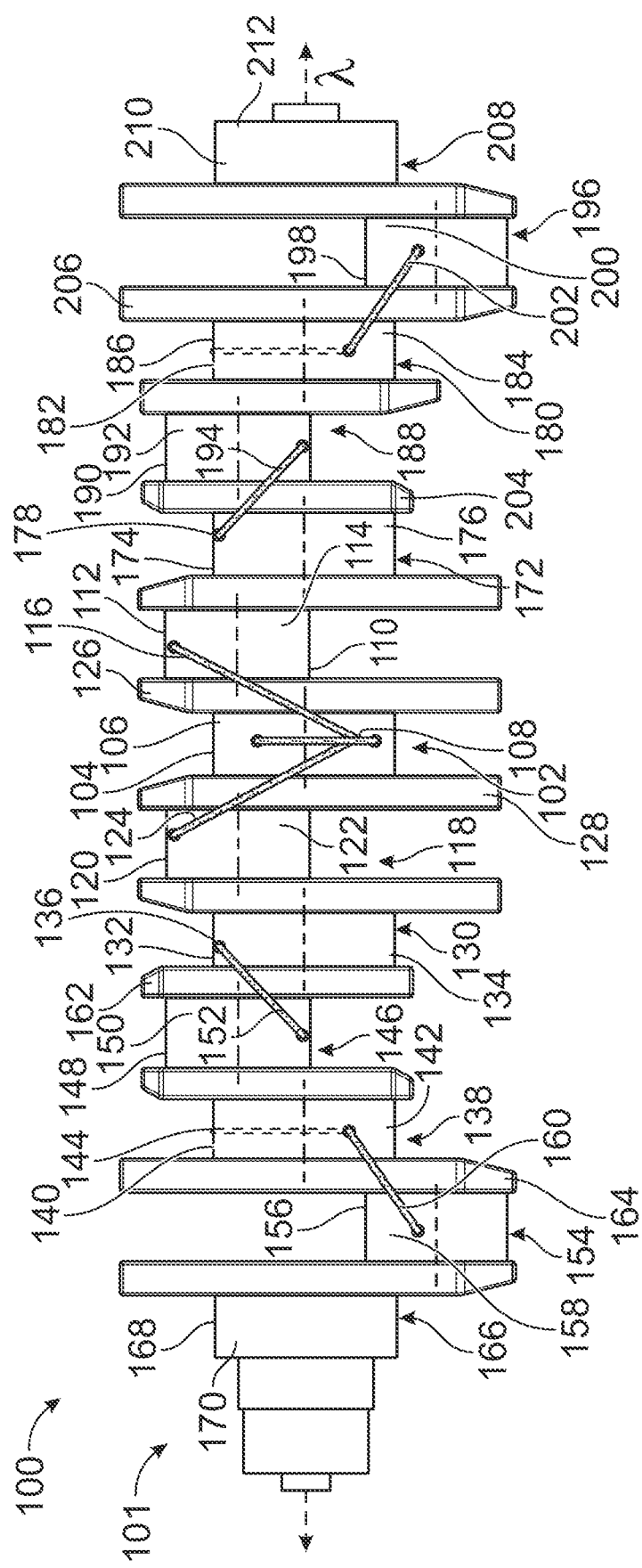
FIG. 3 is another cross-sectional view of the lubricating system from an engine according to the embodiment of FIG. 1.
Figure 4:
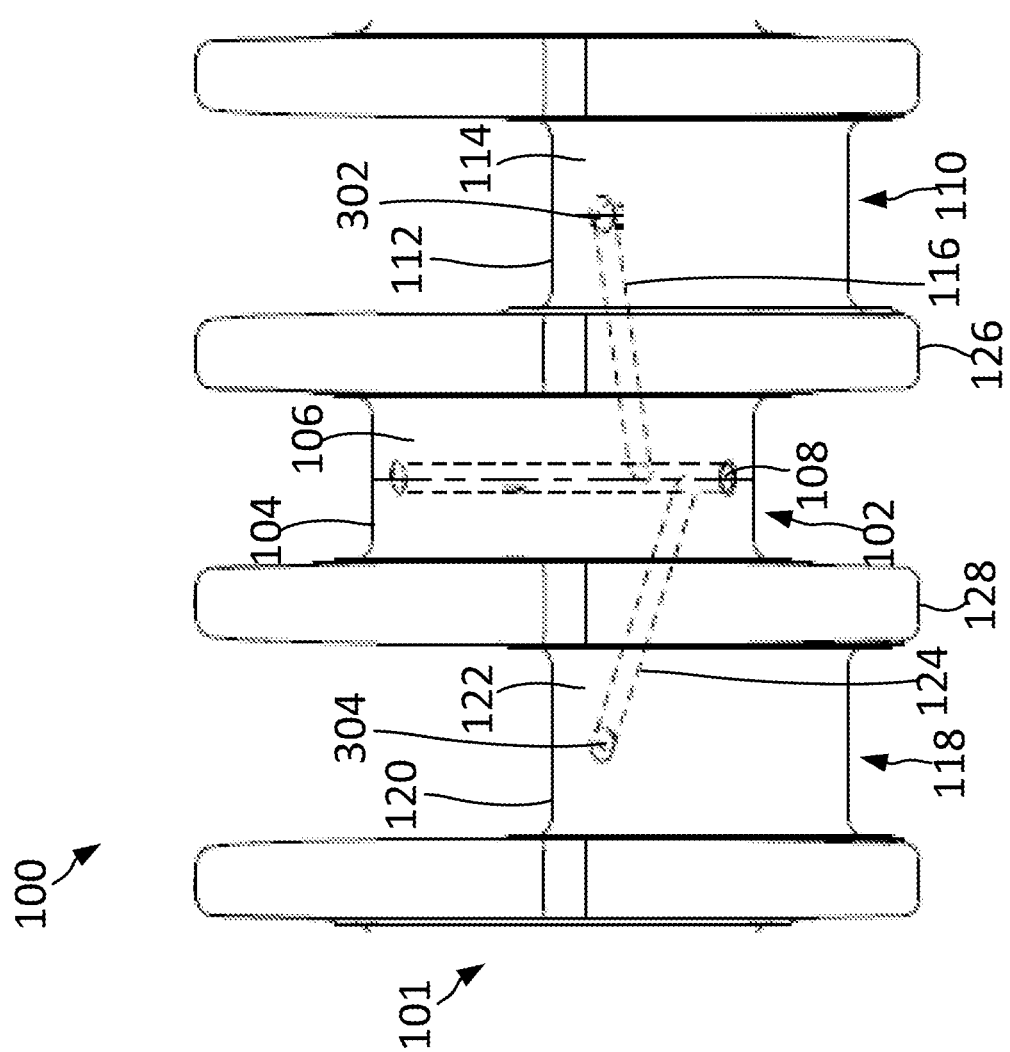
FIG. 4 is cross-sectional view of a first portion of the lubricating system from an engine according to the embodiment of FIG. 1.
Figure 5:
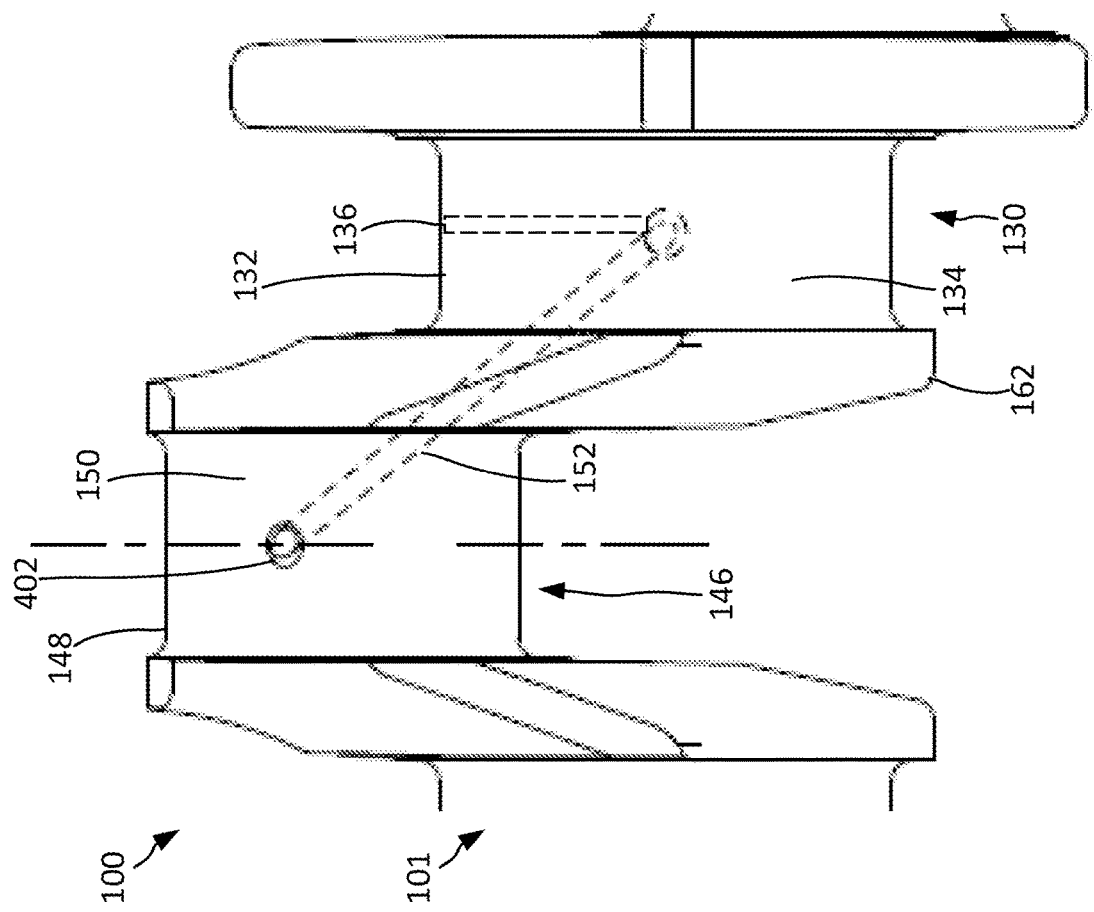
FIG. 5 is cross-sectional view of a second portion of the lubricating system from an engine according to the embodiment of FIG. 1.
Figure 6:
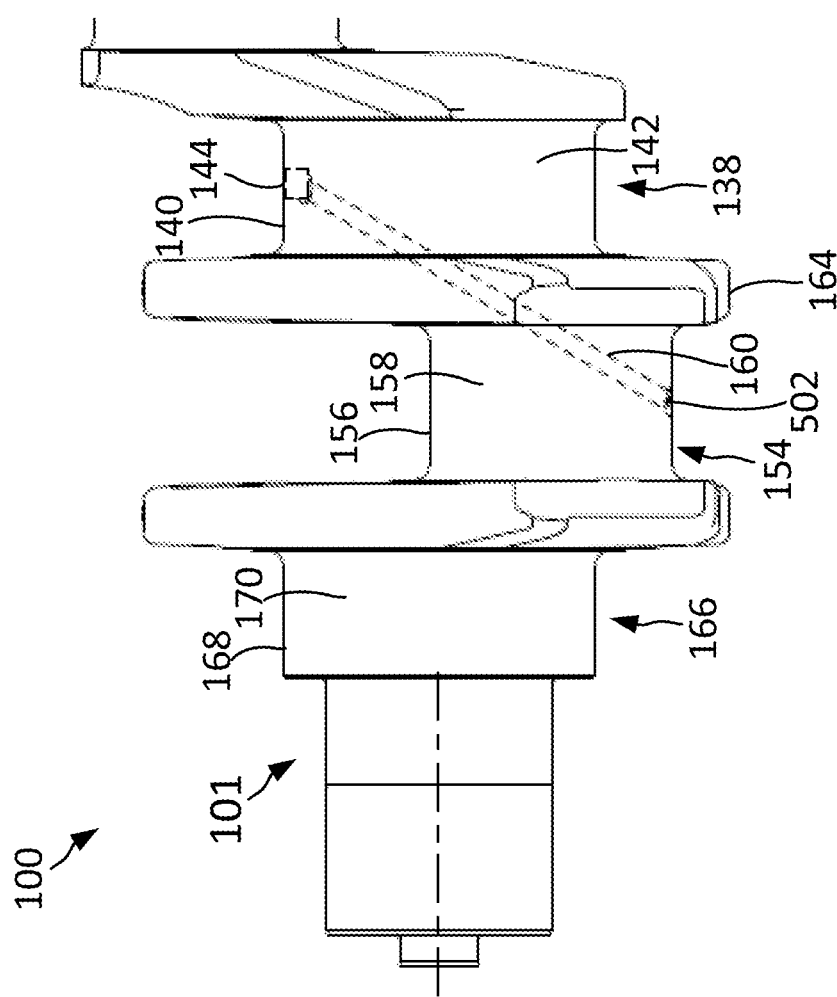
FIG. 6 is cross-sectional view of a third portion of the lubricating system from an engine according to the embodiment of FIG. 1.
Figure 7:
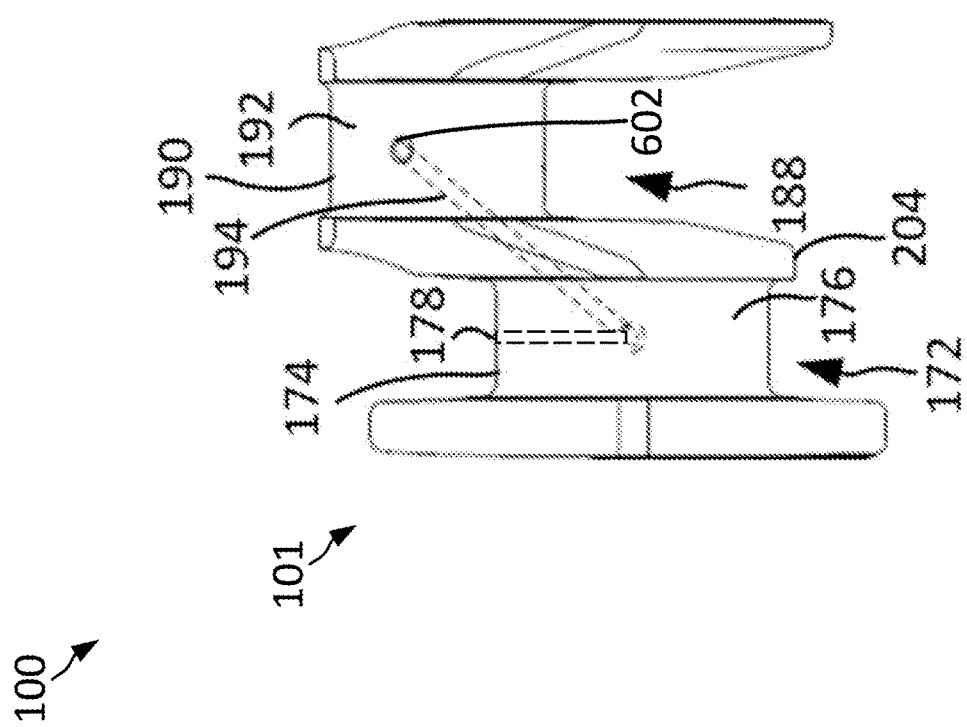
FIG. 7 is cross-sectional view of a fourth portion of the lubricating system from an engine according to the embodiment of FIG. 1.
Figure 8:
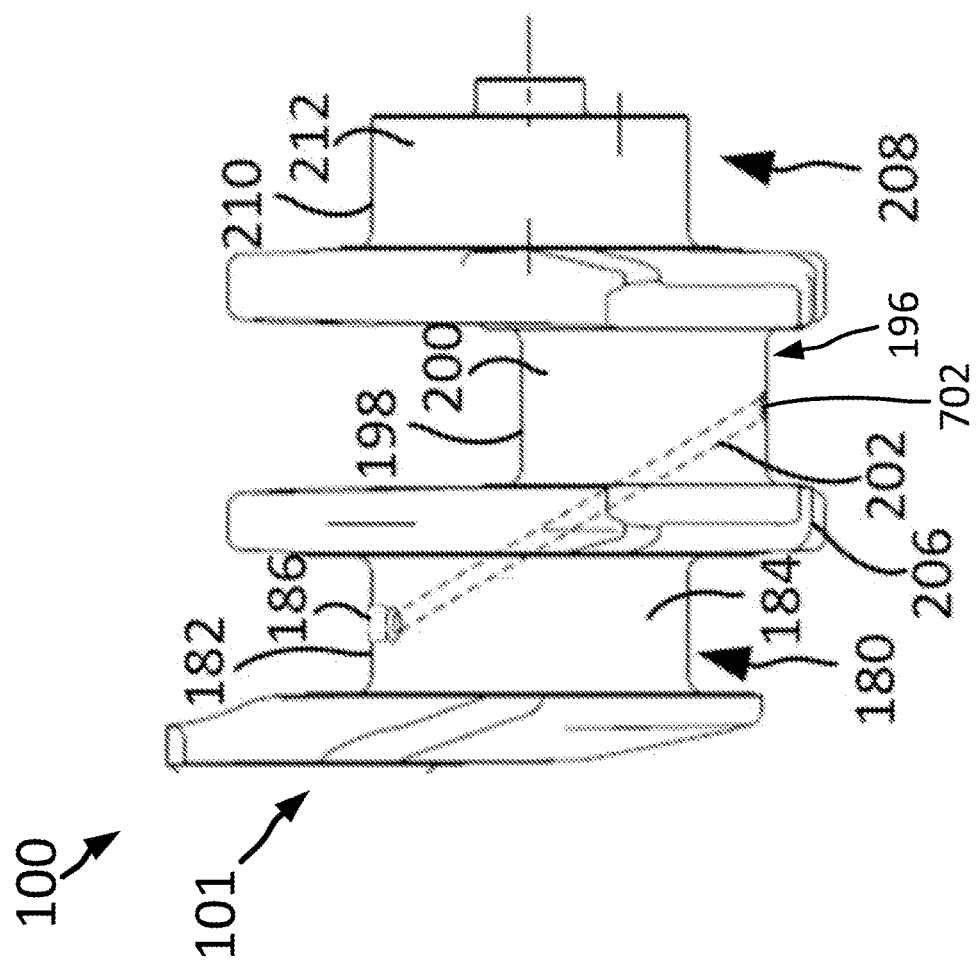
FIG. 8 is cross-sectional view of a portion of the lubricating system from an engine according to the embodiment of FIG. 1.

As shown in FIGS. 1-3, the first pin journal 110 is positioned adjacent to the first crank web 126. The first pin journal 110 includes a first pin journal oil hole 302. The first pin journal oil hole 302 extends from the first pin journal housing 112, through each of the first crank 114, the first crank web 126, and the first shaft 106, to the first main journal oil passage 108. The first pin journal oil hole 302 receives a portion of oil from the first main journal oil passage 108 and provides a portion of oil to the first pin journal lubrication space. For example, the first pin journal oil hole 302 is coupled to the first oil passage 116. For example, the first pin journal oil hole 302 defines an opening to the first oil passage 116.

The first pin journal 110 is fluidly isolated from the rest of the lubrication system 100. For example, the first pin journal 110 is fluidly isolated from the fifth main journal 172 and the second pin journal 118.

As shown in FIGS. 1-4, the system 100 for lubricating a crankshaft 101 of an engine includes the first main journal 102, the second main journal 130, the third main journal 138, the fourth main journal 166, and the fifth main journal 172 configured to rotate about the longitudinal axis λ and are in fluid communication with the oil supply. The system 100 includes the first pin journal 110 positioned between the first main journal 102 and the fifth main journal 172. The first pin journal 110 is fluidly isolated from the fifth main journal 172. The second pin journal 118 is positioned between the first main journal 102 and the second main journal 130. The second pin journal 118 is fluidly isolated from the second main journal 130. Further, the third pin journal 146 is positioned between the second main journal 130 and the third main journal 138. The third pin journal 146 is fluidly isolated from the third main journal 138. The system 100 also includes the fourth pin journal 154 positioned between the third main journal 138 and the fourth main journal 166. The fourth pin journal 154 is fluidly isolated from the fourth main journal 166.

The second pin journal 118 is positioned adjacent to the second crank web 128. The second oil passage 124 includes a second pin journal oil hole 304. The second pin journal oil hole 304 extends from the second pin journal housing 120, through each of the second crank 122, the second crank web 128, and the first shaft 106, to the first main journal oil passage 108. The second pin journal oil hole 304 receives a portion of oil from the first main journal oil passage 108 and provides a portion of oil to the second pin journal lubrication space. For example, the second pin journal oil hole 304 defines an opening to the second oil passage 124.

The second pin journal 118 is also fluidly isolated from the rest of the lubrication system 100. For example, the second pin journal 118 is fluidly isolated from the second main journal 130 and the first pin journal 110.

Further, as shown in FIGS. 1-3 and FIG. 5, the third pin journal 146 is positioned adjacent to the third crank web 162, and the third crank web 162 is positioned adjacent to the second main journal 130. The third pin journal 146 includes a third pin journal oil hole 402. The third pin journal oil hole 402 extends from the third pin journal housing 148, through each of the third crank 150, the third crank web 162, and the second shaft 134, to the second main journal oil passage 136. The third pin journal oil hole 402 receives a portion of oil from the second main journal oil passage 136 and provides the portion of oil to the third pin journal lubrication space. For example, the third pin journal oil hole 402 defines an opening to the third oil passage 152.

The third pin journal 146 and the second main journal 130 are fluidly isolated from the rest of the lubrication system 100. For example, the third pin journal 146 is fluidly isolated from the third main journal 138 and the second pin journal 118.

As shown in FIGS. 1-3 and FIG. 6, the fourth pin journal 154 is positioned adjacent to the fourth crank web 164, and the fourth crank web 164 is positioned adjacent to the third main journal 138. The fourth pin journal 154 includes a fourth pin journal oil hole 502. The fourth pin journal oil hole 502 extends from the fourth pin journal housing 156, through each of the fourth crank 158, the fourth crank web 164, and the third shaft 142, to the third main journal oil passage 144. The fourth pin journal oil hole 502 receives a portion of oil from the third main journal oil passage 144 and provides the portion of oil to the fourth pin journal lubrication space. For example, the fourth pin journal oil hole 502 defines an opening to the fourth oil passage 160.

The fourth pin journal 154 and the third main journal 138 are fluidly isolated from the rest of the lubrication system 100. For example, the fourth pin journal 154 is fluidly isolated from the fourth main journal 166 and the third pin journal 146.

As shown in FIGS. 1-3 and FIG. 7, the fifth pin journal 188 is positioned adjacent to the fifth crank web 204, and the fifth crank web 204 is positioned adjacent to the fifth main journal 172. The fifth pin journal 188 includes a fifth pin journal oil hole 602. The fifth pin journal oil hole 602 extends from the fifth pin journal housing 190, through each of the fifth crank 192, the fifth crank web 204, and the fifth shaft 176, to the fifth main journal oil passage 178. The fifth pin journal oil hole 602 receives a portion of oil from the fifth main journal oil passage 178 and provides the portion of oil to the fifth pin journal lubrication space. For example, the fifth pin journal oil hole 602 defines an opening to the fifth oil passage 194.

The fifth pin journal 188 and the fifth main journal 172 are also fluidly isolated from the rest of the lubrication system 100. For example, the fifth pin journal 188 is fluidly isolated from the sixth main journal 180 and each of the first pin journal 110 and the sixth pin journal 196.

As shown in FIGS. 1-3 and FIG. 8, the sixth pin journal 196 is positioned adjacent to the sixth crank web 206, and the sixth crank web 206 is positioned adjacent to the sixth main journal 180. The sixth pin journal 196 includes a sixth pin journal oil hole 702. The sixth pin journal oil hole 702 extends from the sixth pin journal housing 198, through each of the sixth crank 200, the sixth crank web 206, and the sixth shaft 184, to the sixth main journal oil passage 186. The sixth pin journal oil hole 702 receives a portion of oil from the sixth main journal oil passage 186 and provides the portion of oil to the sixth pin journal lubrication space. For example, the sixth pin journal oil hole 702 defines an opening to the sixth oil passage 202.

The sixth pin journal 196 and the sixth main journal 180 are also fluidly isolated from the rest of the lubrication system 100. For example, the sixth pin journal 196 is fluidly isolated from the seventh main journal 208 and each of the fifth pin journal 188.

III. Construction of Example Embodiments

While this specification contains many specific implementation details, these should not be construed as limitations on the scope of what may be claimed but rather as descriptions of features specific to implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a sub combination or variation of a sub combination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the present disclosure.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to," "in fluid communication with," and the like, as used herein, mean the two components or objects have a pathway formed between the two components or objects in which a fluid, such as a lubricant, oil, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. A system for lubricating a crankshaft of an engine, comprising:
   a first main journal comprising a first main journal housing and a first shaft;
   a first main journal oil passage extending at least partially through the first shaft;
   a first pin journal comprising a first pin journal housing and a first crank;
   a first oil passage extending from the first main journal oil passage and at least partially through the first crank, the first oil passage in fluid communication with the first main journal oil passage;
   a second pin journal comprising a second pin journal housing and a second crank; and
   a second oil passage extending from the first main journal oil passage and at least partially through the second crank, the second oil passage in fluid communication with the first main journal oil passage.

2. The system of claim 1, further comprising:
   a first crank web rotatably coupled to the first main journal and the first pin journal, the first oil passage extending through the first crank web; and
   a second crank web rotatably coupled to the first main journal and the second pin journal, the second oil passage extending through the second crank web.

3. The system of claim 1, wherein the first oil passage extends at a first non-zero angle from the first main journal oil passage, and the second oil passage extends at a second non-zero angle from the first main journal oil passage.

4. The system of claim 3, wherein the first non-zero angle is not equal to the second non-zero angle, and wherein the second oil passage is vertically offset from the first oil passage extending from the first main journal oil passage.

5. The system of claim 1 further comprising:
a second main journal comprising a second main journal housing and a second shaft;
a second main journal oil passage extending at least partially through the second shaft;
a third main journal comprising a third main journal housing and a third shaft;
a third main journal oil passage extending at least partially through the third shaft;
a third pin journal comprising a third pin journal housing and a third crank; and
a third oil passage extending at least partially through the third crank, the third oil passage in fluid communication with the second main journal oil passage.

6. The system of claim 5, further comprising:
a fourth pin journal comprising a fourth pin journal housing and a fourth crank; and
a fourth oil passage extending at least partially through the fourth crank, the fourth oil passage in fluid communication with the third main journal oil passage.

7. The system of claim 6, further comprising:
a third crank web rotatably coupled to the second main journal and the third pin journal, the third oil passage extending through the third crank web; and
a fourth crank web rotatably coupled to the third main journal and the fourth pin journal, the fourth oil passage extending through the fourth crank web.

8. The system of claim 7, further comprising:
a fourth main journal comprising a fourth main journal housing and a fourth shaft.

9. A system for lubricating a crankshaft of an engine, comprising:
a first main journal comprising a first main journal housing and a first shaft;
a first main journal oil passage extending at least partially through the first shaft;
a first pin journal comprising a first pin journal housing and a first crank;
a first oil passage extending at least partially through the first crank, the first oil passage in fluid communication with the first main journal oil passage;
a second pin journal comprising a second pin journal housing and a second crank; and
a second oil passage extending at least partially through the second crank, the second oil passage in fluid communication with the first main journal oil passage;
a second main journal comprising a second main journal housing and a second shaft;
a second main journal oil passage extending at least partially through the second shaft;
a third main journal comprising a third main journal housing and a third shaft;
a third main journal oil passage extending at least partially through the third shaft;
a third pin journal comprising a third pin journal housing and a third crank;
a third oil passage extending at least partially through the third crank, the third oil passage in fluid communication with the second main journal oil passage;
a fourth pin journal comprising a fourth pin journal housing and a fourth crank; and
a fourth oil passage extending at least partially through the fourth crank, the fourth oil passage in fluid communication with the third main journal oil passage;
a third crank web rotatably coupled to the second main journal and the third pin journal, the third oil passage extending through the third crank web;
a fourth crank web rotatably coupled to the third main journal and the fourth pin journal, the fourth oil passage extending through the fourth crank web;
a fourth main journal comprising a fourth main journal housing and a fourth shaft;
a fifth main journal comprising a fifth main journal housing and a fifth shaft;
a fifth main journal oil passage extending at least partially through the fifth shaft;
a sixth main journal comprising a sixth main journal housing and a sixth shaft;
a sixth main journal oil passage extending at least partially through the sixth shaft;
a fifth pin journal comprising a fifth pin journal housing and a fifth crank; and
a fifth oil passage extending at least partially through the fifth crank, the fifth oil passage in fluid communication with the fifth main journal oil passage.

10. The system of claim 9, further comprising:
a sixth pin journal comprising a sixth pin journal housing and a sixth crank; and
a sixth oil passage extending at least partially through the sixth crank, the sixth oil passage in fluid communication with a fourth main journal oil passage.

11. The system of claim 10, further comprising:
a fifth crank web rotatably coupled to the fifth main journal and the fifth pin journal, the fifth oil passage extending through the fifth crank web; and
a sixth crank web rotatably coupled to the sixth main journal and the sixth pin journal, the sixth oil passage extending through the sixth crank web.

12. The system of claim 9, further comprising:
a seventh main journal comprising a seventh main journal housing and a seventh shaft.

13. The system of claim 9, wherein the third oil passage extends at a third non-zero angle from the third main journal oil passage and the fifth oil passage extends at a fifth non-zero angle from the fifth main journal oil passage, the third non-zero angle and the fifth non-zero angle are substantially equal.

14. The system of claim 10, wherein the fourth oil passage extends at a fourth non-zero angle from the fourth main journal oil passage and the sixth oil passage extends at a sixth non-zero angle from the sixth main journal oil passage, the fourth non-zero angle and the sixth non-zero angle are substantially equal.

15. A system for lubricating a crankshaft of an engine, comprising:
a first main journal, a second main journal, a third main journal, a fourth main journal, and a fifth main journal configured to rotate about a longitudinal axis;
a first pin journal positioned between the first main journal and the fifth main journal, the first pin journal fluidly isolated from the fifth main journal;
a second pin journal positioned between the first main journal and the second main journal, the second pin journal fluidly isolated from the second main journal;
a third pin journal positioned between the second main journal and the third main journal, the third pin journal fluidly isolated from the third main journal; and
a fourth pin journal positioned between the third main journal and the fourth main journal, the fourth pin journal fluidly isolated from the fourth main journal.

16. The system of claim 15, further comprising:
a first main oil passage defined by the first main journal;
a first pin journal oil hole extending from the first pin journal to the first main oil passage providing oil to a first lubrication space; and
a second pin journal oil hole extending from the second pin journal to the first main oil passage providing oil to a second lubrication space.

17. The system of claim 16, further comprising:
a second main oil passage defined by the second main journal; and
a third pin journal oil hole extending from the third pin journal to the second main oil passage providing oil to a third lubrication space.

18. The system of claim 17, further comprising:
a third main oil passage defined by the third main journal; and
a fourth pin journal oil hole extending from the fourth pin journal to the third main oil passage providing oil to a fourth lubrication space.

19. The system of claim 15, wherein each of the first pin journal and the second pin journal are in fluid communication with the first main journal.

20. The system of claim 15 further comprising:
a sixth main journal;
a seventh main journal;
a fifth pin journal positioned between the fifth main journal and the sixth main journal, the fifth pin journal fluidly isolated from the sixth main journal; and
a sixth pin journal positioned between the sixth main journal and the seventh main journal, the sixth pin journal fluidly isolated from the seventh main journal.

\* \* \* \* \*